(No Model.)
J. W. DEANS & W. D. & R. J. FOSTER.
DRIVING CHAIN FOR CYCLES.
No. 596,771. Patented Jan. 4, 1898.
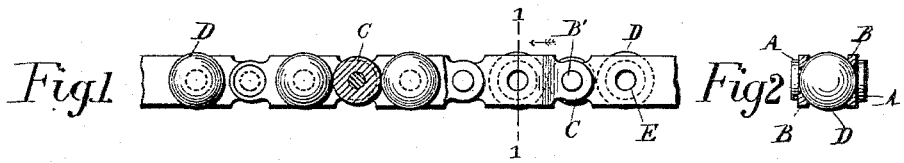
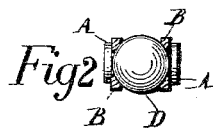
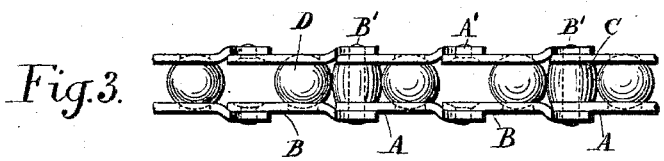
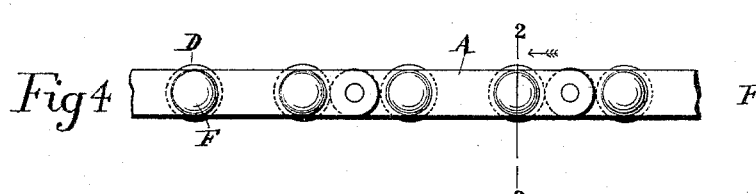
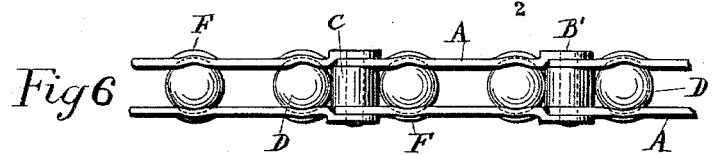
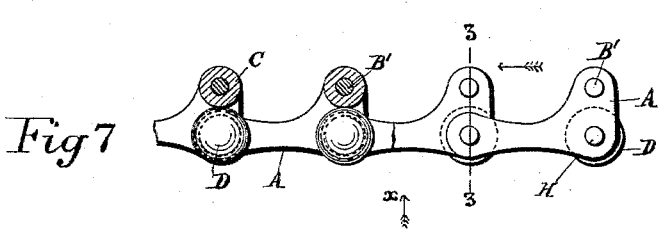
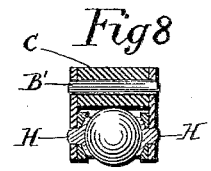
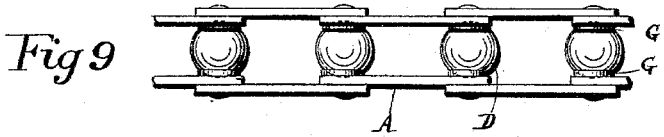
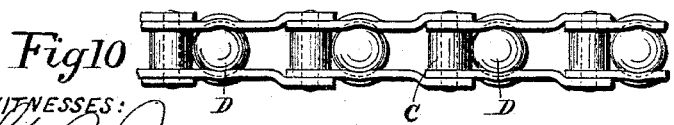
INVENTORS
John W. Deans, William D. Foster
and Robert J. Foster
WITNESSES:
Goepel & Raegener
ATTORNEYS.

UNITED STATES PATENT OFFICE.

JOHN WILLIAM DEANS, WILLIAM DUNN FOSTER, AND ROBERT JOHN FOSTER, OF SELBY, ENGLAND.

DRIVING-CHAIN FOR CYCLES.

SPECIFICATION forming part of Letters Patent No. 596,771, dated January 4, 1898.

Application filed June 23, 1896. Serial No. 596,596. (No model.)

*To all whom it may concern:*

Be it known that we, JOHN WILLIAM DEANS, engineer, of Gowthorpe Road, WILLIAM DUNN FOSTER, manufacturer, of No. 7 Westbourne Grove, and ROBERT JOHN FOSTER, manager, of No. 1 Westbourne Grove, Selby, in the county of York, England, subjects of the Queen of Great Britain, have invented Improvements in or Relating to Driving-Chains for Cycles or for other Purposes, of which the following is a specification.

This invention relates to chains, usually known as "driving-chains," for transmitting motion either for cycles or any other machines or purposes where such chain driving-gear is used or applicable, the object of the present invention being to facilitate the chain running onto or off the radial arms, projections, or teeth of the chain-wheels or sprocket-wheels used in such chain driving-gear, and consequently this invention prevents or reduces friction and may be conveniently termed an "antifriction ball-bearing driving-chain."

According to this invention a ball or sphere of any suitable material (advantageously hardened-steel balls, such as those now largely used for "ball-bearings" for the wheel-axles or crank-shafts of cycles, &c.) is supported or held between the two sides of each link in such manner that each such ball or shpere is free to revolve or turn or move in any and every direction—that is, the ball or sphere is not pivoted or mounted on any spindle or fixed axis; also, the balls do not project through the sides of the links. We find it advantageous to employ two such loosely-arranged balls in each link in such positions and at such a distance apart from one another as to permit the radial arm or tooth or projection of the spur-wheel or sprocket-wheel to enter the interstices or spaces between the two said balls, or to enter between the ball and other part of the link when one ball only is used.

The chain may be constructed in any suitable manner, and the links of said chain may be of any suitable pattern, size, and shape to suit our purpose, hinged or jointed together in any suitable manner, with blocks or distance-pieces between, or the links on one side, and may be held or kept the requisite distance apart from but connected to the links on the other side by any suitable means or in any desired manner. On the inside faces of each said strip or link, near one end and exactly opposite one another, according to this invention, a socket-recess, cup, cavity, hole, or opening or other suitable device is provided to form a bearing or means for holding the ball (loosely) in the desired position in between the two sides of the link, but so that said ball can revolve in any and every direction, and a second ball is similarly or otherwise suitably held at or near the other end of said link, so that same can also revolve in any and every direction, and so on with each link throughout the chain.

We will now proceed to describe our present invention with reference to the accompanying drawings, the novel features of which will be finally pointed out in the claims.

Figure 1 is a side view, partly in section, Fig. 2 a cross-section on line 1 1, Fig. 2, and Fig. 3 a plan, of one form of driving-chain—viz., with jointed links—according to our present invention. Fig. 4 is a side view, Fig. 5 a cross-section on line 2 2, Fig. 4, and Fig. 6 a plan, of an ordinary link chain having our improvements applied thereto. Fig. 7 is a side view, partly in section, Fig. 8 a cross-section on line 3 3, Fig. 7, and Fig. 9 an under side plan, (*i. e.*, looking in the direction of the arrows *x*,) of another construction of chain and links, known as a "lever-chain," having our present improvements applied thereto. Fig. 10 shows a chain with one ball only in each link.

Similar letters of reference indicate corresponding parts throughout.

Referring to Figs. 1 to 3, each link is formed of two parts A B, riveted or otherwise suitably jointed together at A' and each such link A B connected up to the next link by means of a rivet or pin, such as B', and a distance block or roller C in the usual or any suitable manner. D D are the balls, which in this arrangement are mounted in the links by forming a hole E right through each side plate of each link and countersinking each such hole E on the inside face of each link, so as to thus form a concavity corresponding to the size of the ball D, which does not project beyond the sides of the links, each of which balls is thus held securely between the two opposite holes E in each pair of side plates A A or B B, (forming the links A B, as aforesaid,) but in such manner that the balls D are free to revolve in any and every direction, (see Fig. 2,) the sides of the links being held apart by the blocks or distance-pieces C aforesaid. In order to prevent these balls D from being forced out of their sockets or bearings in the links and also in order to avoid undue strain or wear upon said bearings or sockets in said links, we arrange and mount these balls D in such position in the links that each ball is proximate to and almost touches the fixed block or distance-piece C and is so close to same that when driving strain (or any other strain or pressure) is put upon said ball in the direction of the length of the chain said ball D will be forced against (i. e., into actual contact with) its proximate block or distance-piece C, which latter consequently receives the strain and imparts same to the chain, and vice versa, and thereby prevents or reduces the strain or wear upon the bearings of said balls.

In the arrangement shown in Figs. 4 to 7 each link A is formed of single plates jointed together at B' with blocks or distance-pieces C, as before described, or in any other suitable manner, each such plate or part of the link A having two sockets or recesses F formed therein in any suitable manner—for instance, by embossing, stamping, &c.—so that the ball D is held securely in these bearings or sockets thus provided in the links close to the distance-block C and at the same time is free to revolve in every direction, as before described.

Referring now to Figs. 7 to 9, the links A are formed of peculiar shape, (for which no claim separately is made herein,) with the distance-piece or block C mounted on the axes B' therein, as shown. The balls D are mounted and held in a position perpendicular to said distance-blocks C (instead of in a horizontal line therewith, as in the other figures of the drawings) and proximate thereto, so as to just touch. The sockets or bearings for said balls in a chain of the character illustrated in Figs. 7 to 9 may be of any suitable description, in the arrangement illustrated said bearings being formed by means of cups or sockets G, each of which latter is concave on its inner face and having a stud or rivet head H extending from its exterior face, this stud or rivet head H being of sufficient length to pass through the links and be riveted on the exterior thereof, whereby each such bearing for balls D is fixed and retained in position, as shown in the drawings.

In Fig. 10 a single-link chain is shown somewhat similar to the chain shown in Figs. 4 and 6, with the difference that in the case illustrated in Fig. 10 only one ball D is arranged in each link, mounted so as to revolve freely in any direction, as described with reference to Figs. 4 and 6. In this case the spokes, teeth, radial arms, or projections of the sprocket or toothed wheels will enter in the space between the ball D and the more distant block or distance-piece C. In the cases illustrated in Figs. 1 to 6 such spokes, radial arms, or teeth on the sprocket-wheels or toothed wheels (around which said chains run) would enter in the interstices or spaces between the two balls D in each link, and thus this said ball-bearing chain will readily run on and equally readily run off said spokes or sprocket-teeth, and similarly with regard to the arrangement illustrated in Figs. 7 to 9. Thus the spoke or radial arm or tooth of the sprocket or chain wheel can freely enter between these two balls in each link, and as the latter are free to revolve in any and every direction the tooth or radial arm makes a rolling contact with the ball or balls D of the chain, and thereby friction is prevented or reduced to a minimum both as regards the driving-wheel and the driven wheel.

The bearings or means for holding the balls D in position may, if desired, be so arranged as to permit a certain amount of play or movement of the balls along or in the link either longitudinally or otherwise.

If desired, balls may be loosely arranged in or on the teeth or radial arms of the sprocket or chain wheel, or rollers may be pivoted or journaled or otherwise suitably mounted or arranged in or on said teeth or radial arms to form rolling contact-surfaces; but no claim whatever is made herein to any such rolling contact-surfaces in or on the sprocket-wheel. Or, if desired, the radial arms or teeth of the sprocket or chain wheel may be grooved or otherwise suitably formed or arranged in any desired manner to coöperate or work in conjunction with a chain having ball-bearings therein according to this invention.

Having thus described our invention, what we claim as new, and desire to secure by Letters Patent of the United States, is—

1. In a sprocket-chain, the combination, with the links having sockets formed in the inner faces thereof, of balls mounted in said sockets between said links so as to leave a space for the reception of the sprocket-tooth between each pair of balls, whereby each tooth is engaged upon each side by one of the antifriction-balls, substantially as set forth.

2. In driving-chains for cycles, the combination with the links of the chain, which are provided with sockets, of balls arranged to turn in said sockets in all directions, said balls being of such diameter as that the contact portions of the balls, which turn entirely within the sockets, are located at the extremities of a diameter of each ball, whereby the balls are prevented from projecting through the sides of the links, substantially as set forth.

3. In driving-chains for cycles, the combination with the links of the chain, which are provided with distance-pieces separating the side portions of the links throughout the length of the chain, of balls mounted in said links between said distance-pieces, and means for holding said balls within the links so that they are adapted to rotate in all directions, substantially as set forth.

4. In driving-chains for cycles or for other purposes, having fixed blocks or distance-pieces mounted therein, the combination with the links of said chain, of a ball mounted in each of said links close to and capable of touching said distance-blocks, and means to hold said balls in said links in such a manner that said balls are free to revolve in any direction in said links, substantially in the manner and for the purposes hereinbefore set forth.

5. In driving-chains for cycles or for other purposes, having fixed blocks or distance-pieces mounted therein, the combination with the links of said chain, of balls mounted in each of said links close to and capable of touching said distance-blocks, and means to hold said balls in said links in such a manner that said balls are free to revolve in any direction in said links, substantially in the manner and for the purposes hereinbefore set forth.

6. The combination with the links of a driving-chain for cycles or for other purposes, of blocks or distance-pieces at the junction of each pair of links and balls, such as D, mounted in the links adjacent to each side of said blocks and capable of touching said blocks, and bearings provided in said links adapted to retain said balls in position while allowing said balls to be turned in any direction, substantially as and for the purposes hereinbefore described.

JOHN WILLIAM DEANS.
WILLIAM DUNN FOSTER.
ROBERT JOHN FOSTER.

Witnesses:
CHAS. PRUST,
HENRY DICKINSON.